United States Patent [19]

Roehrick

[11] 4,228,833

[45] Oct. 21, 1980

[54] ECOLARIUM AQUARIUM FILLER

[76] Inventor: Otto A. Roehrick, 1333 Elkhorn Blvd., Rio Linda, Calif. 95673

[21] Appl. No.: 729,307

[22] Filed: Oct. 4, 1976

[51] Int. Cl.$^2$ .................... B65B 39/00; B67C 11/02
[52] U.S. Cl. ............................ 141/340; 210/169
[58] Field of Search ................ 141/98, 331–345; 210/169; 43/56, 57; 261/121 M; 15/1.7

[56] References Cited

U.S. PATENT DOCUMENTS

| 2,748,075 | 5/1956 | Hovlid | 210/169 |
| 3,151,069 | 9/1964 | Halpert | 210/169 |
| 3,897,338 | 7/1975 | Bennett et al. | 210/169 |

FOREIGN PATENT DOCUMENTS 1159 of 1893 United Kingdom ............ 141/331

Primary Examiner—Richard E. Aegerter

[57] ABSTRACT

A filling device adapted for hanging on the side of an aquarium and Ecolarium comprising of an enclosed cup with an elongated tube protruding upward from the rim of the top of said cup. The tube being long enough to span the area from the bottom of the container to the top where the tube is flared inwardly and flat and hooked to the foreside of the container, for holding in an up right position while filling the enclosed cup also having very small holes from the enclosed topside stopping the downward and sideward plunge of the water as it is poured, small streams protruding upward and inward eliminating disturbing landscapes and waterscapes. The same also being telescoped for adjustment for taller tanks the upper tube being smaller than the lower tube in order for insertion into the lower larger tube affixed to said bottom deflector.

2 Claims, 5 Drawing Figures

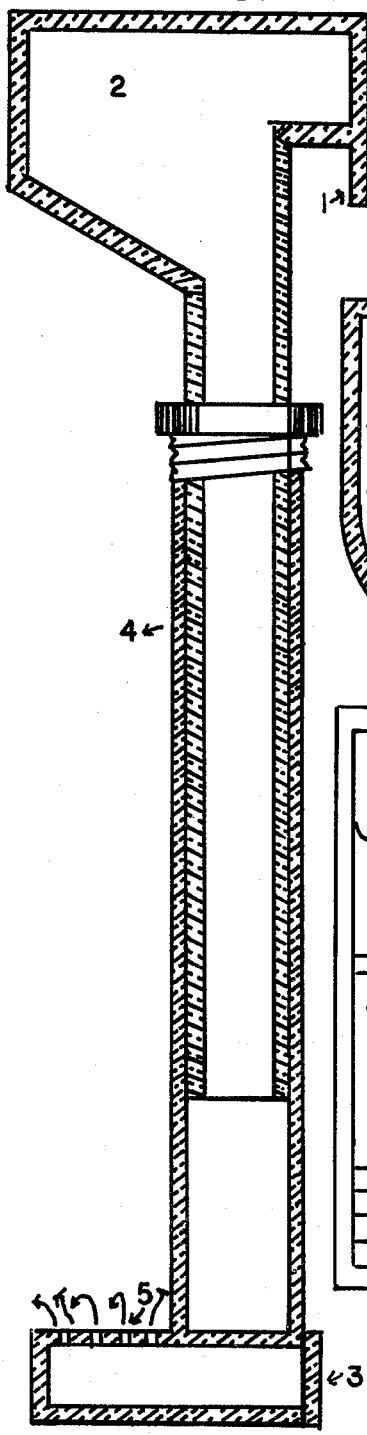
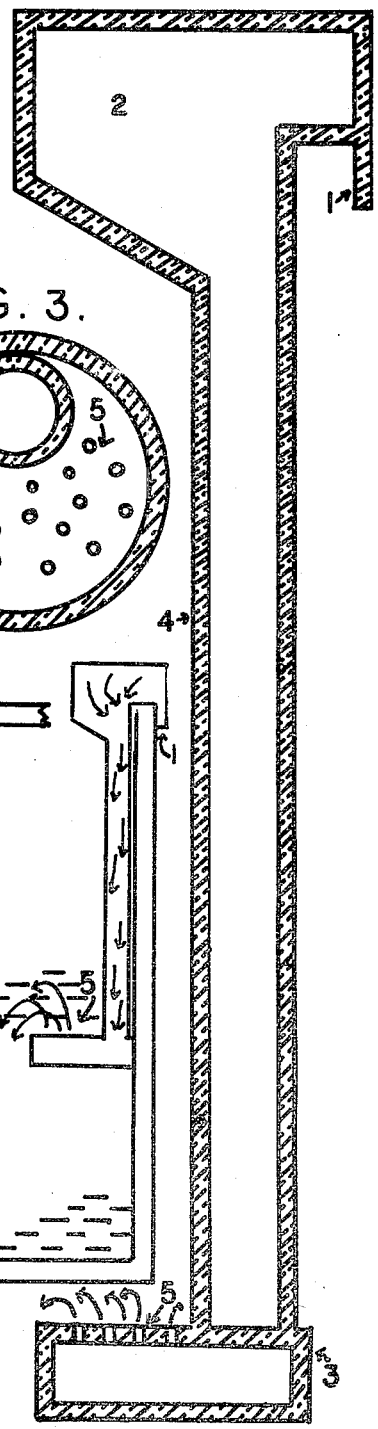
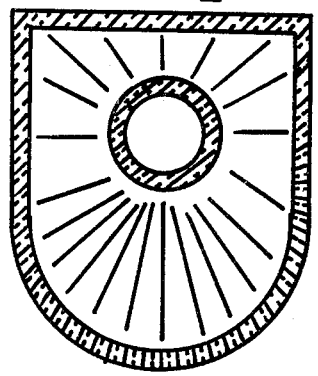
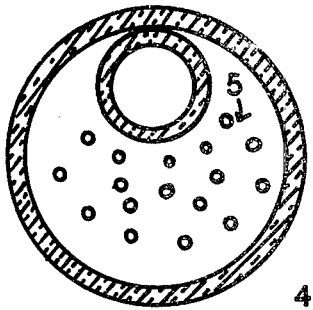
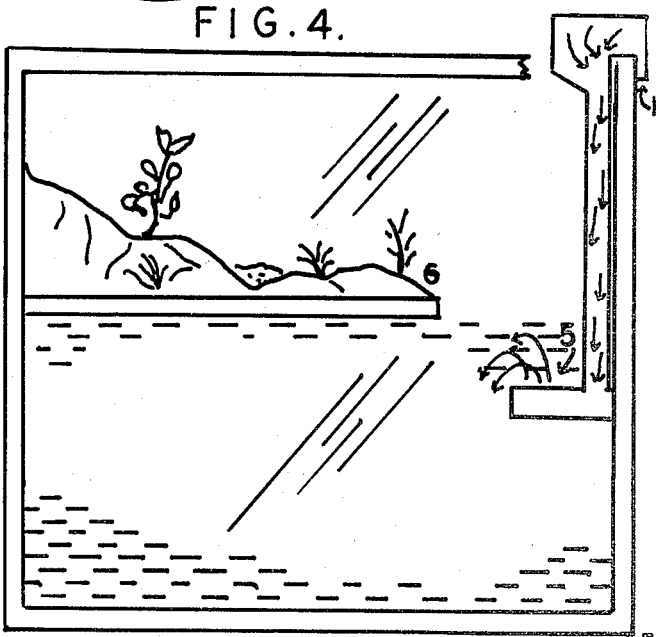

ECOLARIUM AQUARIUM FILLER

BACKGROUND OF THE INVENTION

The present invention relates to a novel device for filling and/or adding water to an aquarium or Ecolarium without disturbing the landscaping or waterscaping.

While some people have used stones or plates in the bottom of the aquarium to keep from churning up the gravel, nowhere have I heard of any manufactured device to prevent the pitting and churning of the sand layer or uprooting plants as water is poured into the aquarium. While setting a plate or cup into the bottom of an aquarium relieves this problem somewhat, one must still reach down into the aquarium filled with water to retrieve this plate, thus getting water up to the elbows which drips on furniture and floor when the arm and plate are removed. My novel device eliminates the unsatisfactory conditions created by direct pouring into the aquarium or the plate and cup method and since the invention of the Ecolarium there is an even greater need for my invention since the Ecolarium is twice as tall as an aquarium and the water level is only half way up which means quite a drop for water that is poured in to fill and/or add water to the Ecolarium. I feel aquarists and Ecolarists would appreciate my invention and should know about it and it meets all of the patent requirements of being new and novel.

The general object of this invention therefore is a means by which one can add water to a aquarium like container without uprooting plants or turning other objects or decorations over. Another object of this invention is the elimination of water spots on the glass from splashing water.

FIG. 1 is the splashless filler.

FIG. 2 the receiving end.

FIG. 3 the enclosed cup at the bottom showing the small exit holes.

FIG. 4 how it is anchored on the side of a Ecolarium or aquarium when in use.

FIG. 5 shows a view of the conduit having an adjustment provision.

By looking at the drawings one can see what it looks like. FIG. 1 is the device. It consists of an enlarged top, 2, and FIG. 2. This enlarged top includes a means by which it is anchored to the side of the Ecolarium, (FIG. 1, 1). This device has an extention, 4, reaching under the water line, 5. The bottom is sealed off with a top wall being perforated with a plurality of discharge vents. A, 3, and FIG. 3. The perforations being mounted so the water is defused upward, thus eliminating any splashing. FIG. 4 shows how the device is used in the Ecolarium. When using this device in an aquarium the extention may be shorter. In some models the extention may be adjustable to fit tanks of varying heights. 6 is the Ecolarium planting shelf.

The Ecolarium Filler consists of; an enlarged top, a recieving end flared inwardly with a flush vertical front, a broad holder for balancing on the front side, a tube long enough to reach under the water line, a cup mounted on the end with a solid bottom and a perforated top side thus defusing the water upward, eliminating splashing and churning water.

It will thus be appreciated that with the present invention there is provided an extremely economical and novel Ecolarium and/or aquarium filler. While I have illustrated and described one embodiment of my invention it is to be understood that such is merely illustrative and not restrictive and that variations and modifications may be made therin without departing from the spirit and scope of the invention.

I claim for patent this:

1. An ecolarium filler comprising an output container member having a solid bottom wall, solid side walls and a top wall having a portion thereof containing a plurality of small apperture of uniform size and shape, an upper input container member being substantially coextensive with said output container member and having an opening in the top thereof, and a conduit providing a fluid passage way extending from the bottom of said input container member through the top of the said output container member, said input container member having a wall extending beyond a portion of the bottom wall thereof and being parallel to and spaced from the said conduit, the said extended wall, the said bottom portion and the said conduit combined forming a C-shaped channel anchoring means for securing the filler and aligning the same to a vertical wall of a ecolarium.

2. An ecolarium filler as in claim 1 whereon said conduit is telescopically adjustable for varying the length thereof.

* * * * *